No. 804,901. PATENTED NOV. 21, 1905.
H. P. TOWNSEND & C. E. JOHNSON.
PADLOCK.
APPLICATION FILED MAR. 25, 1905.

Witnesses
G. V. Rasmussen

Charles E. Johnson Inventors
and Harry P. Townsend
By their Attorneys

UNITED STATES PATENT OFFICE.

HARRY P. TOWNSEND AND CHARLES E. JOHNSON, OF NEW BRITAIN, CONNECTICUT, ASSIGNORS TO CORBIN CABINET LOCK COMPANY, OF NEW BRITAIN, CONNECTICUT, A CORPORATION OF CONNECTICUT.

PADLOCK.

No. 804,901.  Specification of Letters Patent.  Patented Nov. 21, 1905.

Application filed March 25, 1905. Serial No. 251,933.

*To all whom it may concern:*

Be it known that we, HARRY P. TOWNSEND and CHARLES E. JOHNSON, citizens of the United States, residing at New Britain, county of Hartford, State of Connecticut, have invented certain new and useful Improvements in Padlocks, of which the following is a full, clear, and exact description.

Our invention relates to improvements in padlocks.

The object of our invention is to simplify the construction thereof and so arrange the parts that the picking of the lock is rendered most difficult. These and other advantages will be apparent to the mechanic skilled in the art from a reading of the following description.

Figure 1:
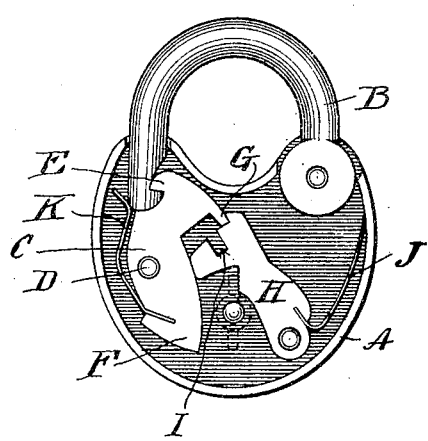
Figure 2:
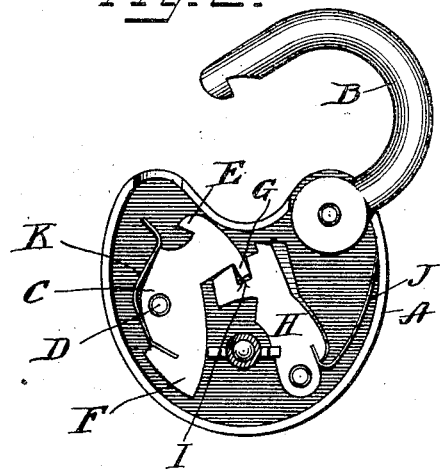
Figure 3:
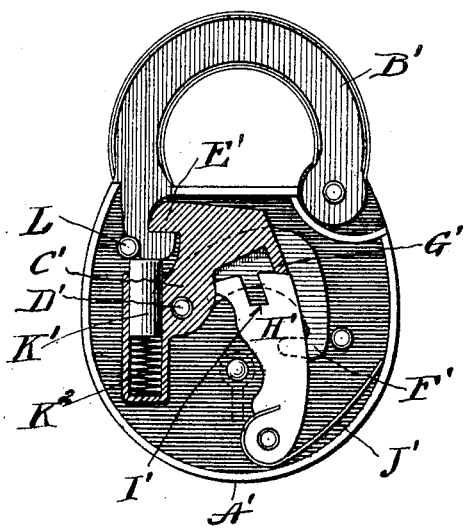
Figure 4:
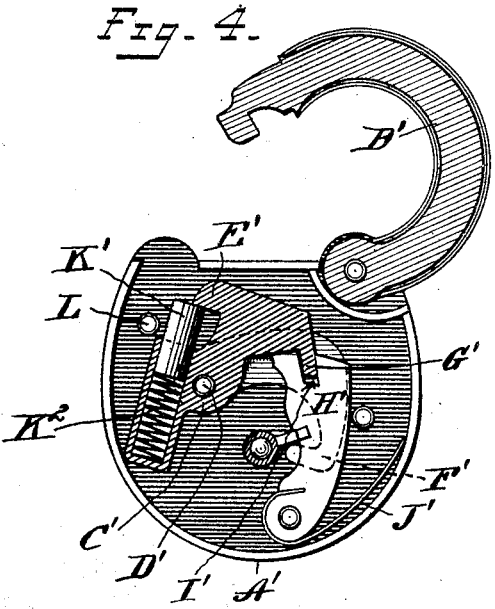

In the drawings, Figure 1 is a side elevation of one form of the lock, one side of the case being removed to reveal the internal construction, the hasp being closed. Fig. 2 is a similar view, the hasp and other parts being in a different position. Fig. 3 is a similar view of another form of the padlock, the hasp being closed. Fig. 4 is a similar view, the hasp and other parts being in a different position.

Referring first to the construction shown in Figs. 1 and 2, A is the lock-case. B is the hasp or shackle. C is the locking-dog, pivoted at D. E is the hooked end of the dog, which is arranged to engage with a notch in the end of the hasp B. F is the heel of the dog, which extends below the pivotal center D. G is the tail of the dog arranged to coact with the tumblers H. The number of tumblers employed is of course immaterial. I is a notch in the end of each tumbler H, arranged to receive the tail G of the dog when said tumblers stand in a certain position. J is a spring for actuating the tumblers to cause them to normally assume the position shown in Fig. 1. K is a spring member carried by the dog C, the same being so arranged that it will tend to throw the hasp open when the hooked end E of the dog is freed therefrom. This may be accomplished, for example, by beveling or inclining the end of the spring member K.

The lock shown in Figs. 1 and 2 is operated by means of a double-bitted key, one bit of which operates the tumblers first while the opposite bit engages the heel F of the dog, so as to swing it upon its pivot D and free the shackle B.

Now referring to the construction shown in Figs. 3 and 4, A' is the casing. B' is the hasp. C' is the dog, pivoted at D'. E' is the hooked end of the dog arranged to engage in a notch in the end of the hasp or shackle B'. F' is the heel of the dog, which in this instance is hooked for the purpose hereinafter described. G' is the tail of the dog C'. H' is the tumbler. I' is a notch therein. J' is a spring for normally causing the tumbler H' to assume the position shown in Fig. 3. K' is the spring member carried by the dog C', the same being in the form of a plunger mounted in a suitable guide on the said dog and pressed outwardly under the influence of the spring $K^2$. In operation it will be observed that the action is generally similar to that of the spring member K of Fig. 1.

Instead of operating the lock of Figs. 3 and 4 by means of a double-bitted key we are permitted to use a single-bitted key, one bitting of which is arranged to operate the tumblers, while the adjacent bitting engages with the hooked heel F' and throws the dog from the position shown in Fig. 3 to the position shown in Fig. 4 after the tumbler or tumblers have been properly lined up. We preferably provide a stop L for the free end of the shackle B'. When present this stop prevents the dog from being thrown out of the tumblers when the hasp stands open, because, as shown in Fig. 4, the side of the member K' will engage said stop L before the tail G' of said dog could be withdrawn from said tumbler.

In both forms of the lock shown it will be observed that the pivot for the dog is placed under the hooked end of the shackle so that if a pull is exerted on said shackle it will not tend to swing the dog and cause the tail to bear heavily against the tumblers, thus making it most difficult to pick the lock in the well-known way by feeling through the tumblers.

The spring member carried by the dog in each instance tends to normally hold the dog into locking engagement with the shackle, and, further than this, it also performs the function of tilting the dog, so as to free the same from the tumblers and cause it to engage the hasp when the latter is closed.

What we claim is—

1. In a padlock, a hasp, a dog therefor, a spring carried by said dog, said hasp coöperating with said spring to throw said dog, and a tumbler coacting with said dog.

2. In a padlock, a hasp, a dog therefor, a spring carried by said dog, said hasp coöperating with said spring to throw said dog thereby, and a tumbler coacting with said dog, said tumbler and dog being arranged to be engaged and operated directly and simultaneously by a suitable key.

3. In a padlock, a hasp, a pivotally-mounted dog, a spring device carried by said dog and arranged to coöperate with said hasp to throw said dog when said hasp is closed, and means to operate said dog to free it from said hasp.

4. In a padlock, a hasp, a dog therefor, a spring carried by said dog, said hasp coöperating with said spring to throw said dog, and a tumbler coacting with said dog, and means to prevent the dog from becoming freed from the tumblers while the hasp is open.

5. In a padlock, a hasp, a tumbler, a pivoted dog, a hooked end arranged to engage the hasp, a tail arranged to engage the tumbler, and a projecting heel or extension arranged to be engaged by a key simultaneously with the tumbler, and means operable by the hasp to throw said dog as the hasp is closed.

6. In a padlock, a hasp, a tumbler, a pivoted dog, a hooked end arranged to engage the hasp, a tail arranged to engage the tumbler, and a projecting heel or extension arranged to be engaged by a key simultaneously with the tumbler, and a spring device carried by said dog, arranged to move the hook of the dog into engagement with the hasp when the latter is closed, said hasp coöperating with said spring device to effect said closing movement of said dog.

HARRY P. TOWNSEND.
CHARLES E. JOHNSON.

Witnesses:
  CHAS. J. COX,
  JOS. H. LATHAM.